US008520256B2

(12) United States Patent
Yamazaki

(10) Patent No.: US 8,520,256 B2
(45) Date of Patent: Aug. 27, 2013

(54) PRINTING APPARATUS WITH IMAGE MEASUREMENT PROCESSING

(75) Inventor: Masataka Yamazaki, Kuwana (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 632 days.

(21) Appl. No.: 12/755,024

(22) Filed: Apr. 6, 2010

(65) Prior Publication Data

US 2011/0051155 A1 Mar. 3, 2011

(30) Foreign Application Priority Data

Aug. 31, 2009 (JP) ................................ 2009-199891

(51) Int. Cl.

*G06K 1/00* (2006.01)
*G03G 15/00* (2006.01)
*B41J 29/393* (2006.01)

(52) U.S. Cl.

USPC ............. 358/1.9; 358/1.14; 358/518; 399/10; 347/19

(58) Field of Classification Search

None
See application file for complete search history.

(56) References Cited

U.S. PATENT DOCUMENTS

| | | | | |
|---|---|---|---|---|
| 4,863,295 | A * | 9/1989 | Miyake et al. | 400/54 |
| 6,122,461 | A | 9/2000 | Shinohara | |
| 7,140,707 | B2 * | 11/2006 | Endo | 347/14 |
| 7,412,176 | B2 * | 8/2008 | Park | 399/18 |
| 7,903,304 | B2 * | 3/2011 | Sakamoto | 358/518 |
| 8,213,031 | B2 * | 7/2012 | Kim | 358/1.14 |
| 2006/0164505 | A1 * | 7/2006 | Maeda | 347/234 |
| 2006/0171748 | A1 | 8/2006 | Inui et al. | |
| 2006/0227202 | A1 | 10/2006 | Suzuki et al. | |
| 2008/0226361 | A1 | 9/2008 | Tomita et al. | |

FOREIGN PATENT DOCUMENTS

| | | | |
|---|---|---|---|
| CN | 101261462 | A | 9/2008 |
| EP | 1 923 749 | A2 | 5/2008 |

(Continued)

OTHER PUBLICATIONS

Extended European Search Report dated Aug. 23, 2011 from related European Application No. 10003833.0.

(Continued)

*Primary Examiner* — Steven Kau
(74) *Attorney, Agent, or Firm* — Scully, Scott, Murphy & Presser, PC

(57) ABSTRACT

A printing apparatus includes: a printing unit which prints an image on a recording medium; a controller which causes the printing unit to execute print processing on the basis of a print request; a measurement unit which executes an image measurement processing using the image printed by the printing unit; a correction unit which corrects the image to be printed by the printing unit on the basis of the result of the image measurement processing; and a detector which detects occurrence of a measurement executable error which stops print processing performed on the recording medium by the printing unit and which can causes the measurement unit to execute the image measurement processing, wherein when the detector detects the measurement executable error during the print processing, the controller controls the printing unit to stop processing the print processing and controls the measurement unit to execute the image measurement processing.

6 Claims, 6 Drawing Sheets

(56) References Cited

FOREIGN PATENT DOCUMENTS

| | | | |
|---|---|---|---|
| JP | 05-204201 | * | 8/1993 |
| JP | A-05-204201 | | 8/1993 |
| JP | 11-015216 | * | 1/1999 |
| JP | A-11-015216 | | 1/1999 |
| JP | 2001-071566 | * | 3/2001 |
| JP | 2001071566 | * | 3/2001 |
| JP | 2003-140410 | * | 5/2003 |
| JP | A-2003-140410 | | 5/2003 |
| JP | 2003-167394 | | 6/2003 |
| JP | 2006-133358 | * | 5/2006 |
| JP | 2006-235584 | * | 9/2006 |
| JP | A-2006-235584 | | 9/2006 |

OTHER PUBLICATIONS

Office Action dated Aug. 9, 2011 received from the Japanese Patent Office from related Japanese Application No. 2009-199891, together with an English-language translation.

English language abstract and machine translation of JP 2006-292824 A dated Oct. 26, 2006.

Chinese Office Action dated Mar. 4, 2013 issued in corresponding Chinese Patent Application No. 201010156876.7, together with English translation.

* cited by examiner

PRINTING APPARATUS WITH IMAGE MEASUREMENT PROCESSING

CROSS REFERENCE TO RELATED APPLICATION

The present application claims priority from Japanese Patent Application No. 2009-199891, which was filed on Aug. 31, 2009, the disclosure of which is incorporated herein by reference in its entirety.

BACKGROUND

The present invention relates to a printing apparatus, and more particularly, to a printing apparatus having an image correction function.

In the past, a printing apparatus that has a registration or calibration function has been known. The printing apparatus prints a pattern on a belt, a sheet, or the like, measures the positional deviation or density of a printed image, and corrects the image on the basis of the measurement. The measurement for the image correction is performed at various times, such as at the time of start or termination of the print job or at the time of standby when printing is not performed.

SUMMARY

However, print processing cannot be performed while a measuring operation is being performed. Accordingly, the printing apparatus stands by at some measurement execution times until a user executes print processing.

The invention has been made on the basis of the above-mentioned circumstances, and an object of the invention is to provide a printing apparatus that can reduce the user's burden of waiting time accompanying the measurement for image correction.

In order to achieve the object, an aspect of the exemplary embodiment provides a printing apparatus comprising:

a printing unit which prints an image on a recording medium;

a controller which causes the printing unit to execute print processing on the basis of a print request;

a measurement unit which executes an image measurement processing using the image printed by the printing unit;

a correction unit which corrects the image to be printed by the printing unit on the basis of the result of the image measurement processing; and a detector which detects occurrence of a measurement executable error which stops print processing performed on the recording medium by the printing unit and which can causes the measurement unit to execute the image measurement processing, wherein when the detector detects the measurement executable error during the print processing, the controller controls the printing unit to stop processing the print processing and controls the measurement unit to execute the image measurement processing.

DESCRIPTION OF EXEMPLARY EMBODIMENTS

First Embodiment

A first embodiment of the invention will be described below with reference to FIGS. 1 to 5.

(Entire Configuration of Printer)

Figure 1:
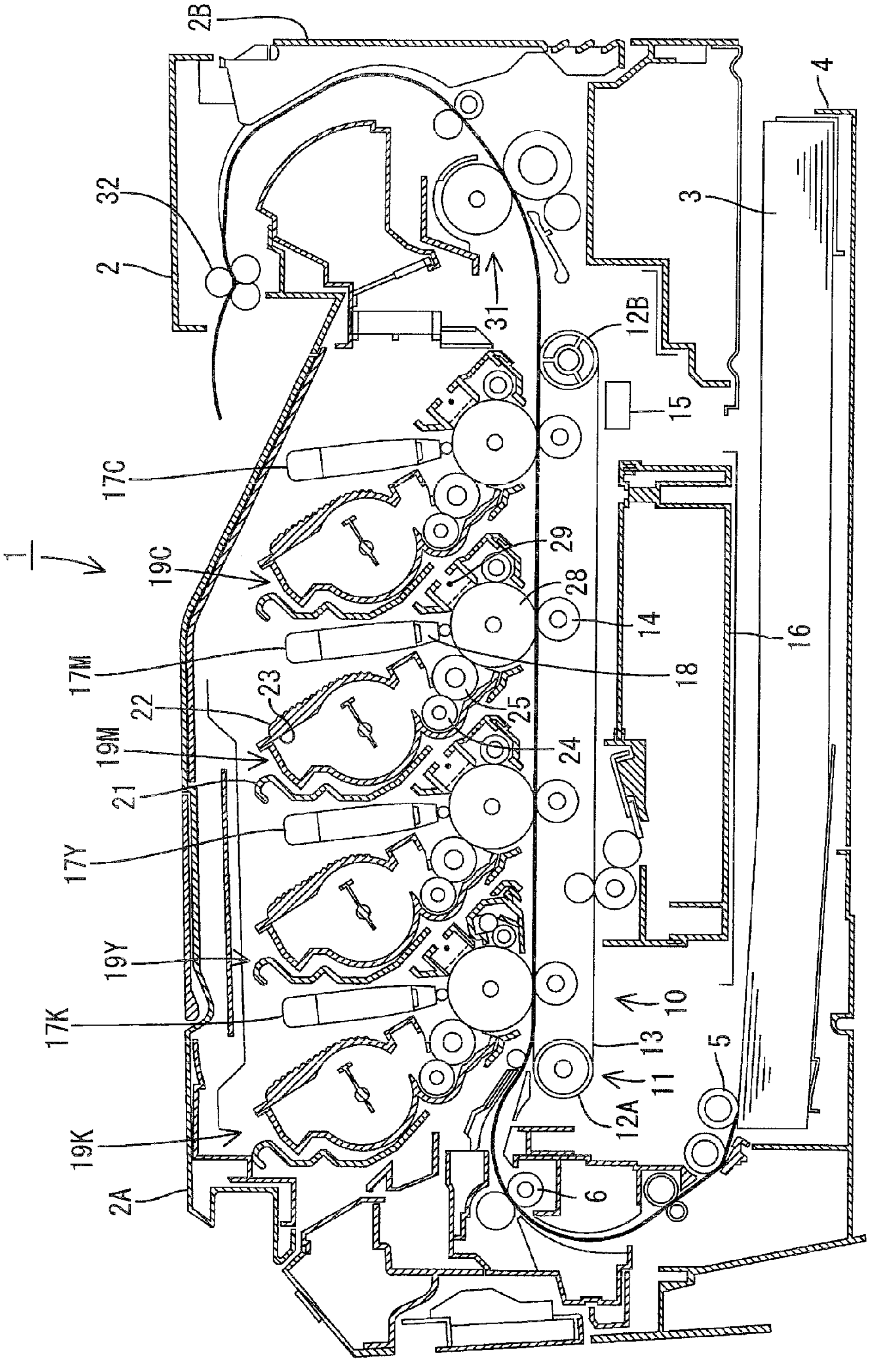
FIG. 1 is a side cross-sectional view showing the schematic configuration of a printer according to a first embodiment of the invention.

FIG. 1 is a side cross-sectional view showing a schematic configuration of a printer 1 (one example of a printing apparatus) according to this embodiment. The printer 1 is an electrophotographic color laser printer. Meanwhile, the left side in FIG. 1 is referred to as a front side in the following description. Further, some of the reference numerals of the same components corresponding to respective colors are omitted in FIG. 1.

The printer 1 is provided with a main body casing 2. An upper cover 2A is provided on an upper surface of the main body casing 2 and a rear cover 2B is provided on a rear surface of the main body casing so that the upper cover and the rear cover are opened and closed. Further, a supply tray 4 in which a plurality of sheets 3 (one example of recording media) may be stacked is mounted at the bottom of the main body casing 2 so as to be drawn toward the front side. A sheet feed roller 5 is provided above the front end of the supply tray 4, so that the sheet feed roller 5 feeds the sheets 3 stacked in the supply tray 4 to a registration roller 6, which is provided above. The registration roller 6 conveys the sheet 3 onto a belt unit 11 of a printing unit 10.

A printing unit 10 (one example of detector unit) includes a belt unit 11, exposure units 17K to 17C, process units 19K to 19C, and a fixer 31.

The belt unit 11 has the structure where an annular belt 13 is stretched between a pair of (front and rear) belt support rollers 12A and 12B. When the belt 13 is driven, a sheet 3 placed on the belt 13 is conveyed toward the rear side. Further, transfer rollers 14 are provided inside of the belt 13 so that the belt 13 is interposed between the transfer rollers and photosensitive drums 28 of process units 19K to 19C to be described below and the transfer rollers face the photosensitive drums, respectively.

Each of the exposure units 17K, 17Y, 17M, and 17C is supported at the lower surface of the upper cover 2A, and a LED head 18 where a plurality of LEDs is arranged in line is provided at the lower end of each of the exposure units. The light emission of each of the exposure units 17K to 17C is controlled on the basis of image data to be printed, and each of the exposure units emits light to lines one by one on the surface of the corresponding photosensitive drum 28 from the LED head 18.

A pair of (left and right) pattern sensors 15, which is used for detecting a pattern formed on the belt 13, is provided below the belt 13. The pattern sensors 15 irradiate light to the surface of the belt 13, receive reflected light by phototransistors or the like, and output signals that have a level corresponding to the amount of received light. A belt cleaner 16, which collects toner, paper powder, etc. adhering to the surface of the belt 13, is provided below the belt unit 11.

The process units 19K, 19Y, 19M, and 19C include frames 21 and four developing cartridges 22 that may be attached to and detached from the frames 21 and correspond to, for example, four colors (yellow, magenta, cyan, and black). When the upper cover 2A is opened, each of the exposure units 17K to 17C is withdrawn upward together with the upper cover 2A. Accordingly, the respective process units 19K to 19C may be individually attached to and detached from the main body casing 2.

Each of the developing cartridges 22 includes a toner storage chamber 23 that stores toner corresponding to each color, a feeding roller 24, and a developing roller 25. Further, the photosensitive drum 28 and a charger 29 are provided below the frame 21. The toner discharged from the toner storage chamber 23 is supplied to the developing roller 25 through the rotation of the feeding roller 24, and is positively charged between the feeding roller 24 and the developing roller 25 by friction. As the photosensitive drum is rotated, the charger 29 uniformly charges the surface of the photosensitive drum 28 first. Then, the exposure unit 17 exposes the surface of the photosensitive drum, so that an electrostatic latent image corresponding to an image to be formed on the sheet 3 is formed on the surface of the photosensitive drum. After that, toner existing on the developing roller 25 is supplied to the surface of the photosensitive drum 28 through the rotation of the developing roller 25, so that the electrostatic latent image is changed into a visible image.

While the sheet 3 placed on the belt 13 passes through transfer positions between the photosensitive drum 28 and the transfer roller 14, toner images carried on the photosensitive drum 28 are sequentially superimposed onto and transfer to the sheet 3 by a transfer voltage applied to the transfer roller 14. The sheet 3 to which the toner images have been transferred is fed to the fixer 31 that is provided on the rear side in the main body casing 2, and the fixer thermally fixes the toner images to the sheet 3. After that, a discharge roller 32 conveys the sheet 3 upward to discharge the sheet to the upper surface of the main body casing 2.

(Electrical Configuration of Printer)

Figure 2:
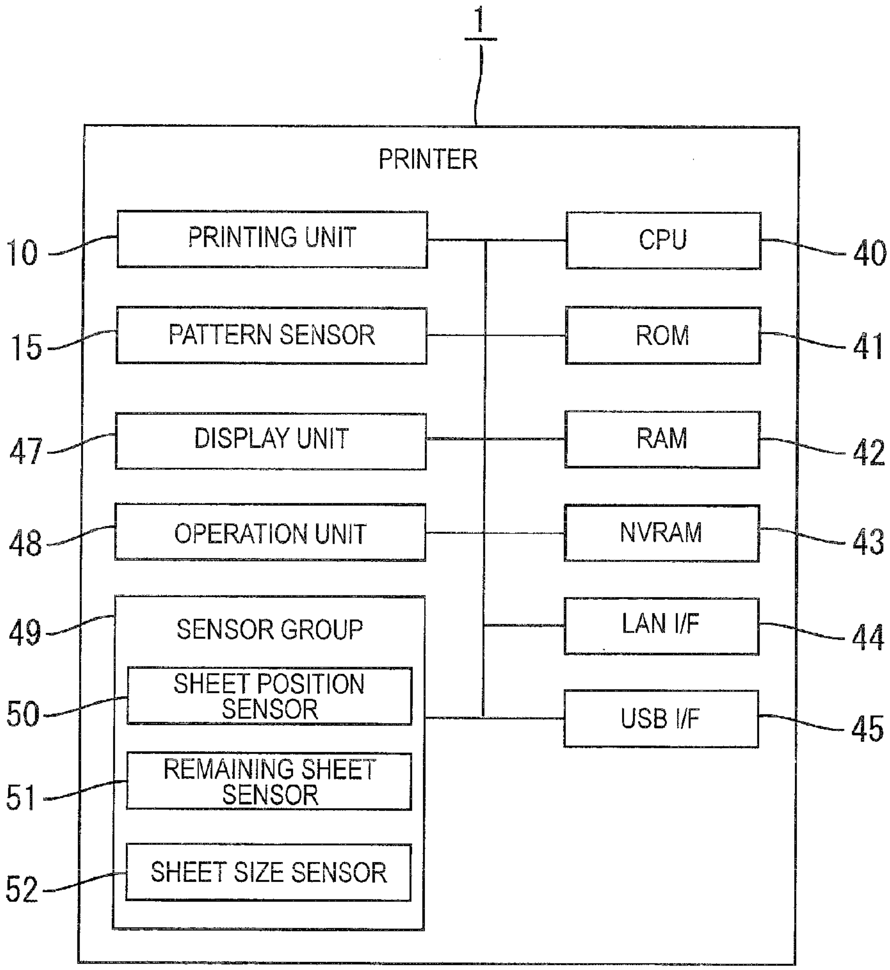
FIG. 2 is a block diagram simply showing the electrical configuration of the printer.

FIG. 2 is a block diagram simply showing the electrical configuration of the printer 1.

As shown in FIG. 2, the printer 1 includes a CPU 40, a ROM 41, a RAM 42, a NVRAM (nonvolatile memory) 43, a network interface 44, and a USB interface 45. Programs for executing various operations of the printer 1 such as job execution processing to be described below are stored in the ROM 41. The CPU 40 (one example of a detector, a controller, a measurement unit, and a correction unit) controls each part in accordance with the program read out from the ROM 41 while storing the processing results in the RAM 42 or the NVRAM 43.

The network interface 44 (one example of communication unit) is connected to an external computer (not shown) or the like through a communication line such as a LAN, so that data communication may be performed between the external computer and the network interface. A USB device such as a USB memory (not shown) may be connected to the USB interface 45, so that data communication may be performed between the connected USB device and the USB interface.

Further, the printer 1 includes a display unit 47 and an operation unit 48. The display unit 47 includes a display, a lamp, etc., and may display various settings screens, the operational state of an apparatus, etc. The operation unit 48 (one example of an operating unit) is provided with a plurality of buttons, and allows a user to input various instructions.

Furthermore, the printer 1 includes a sensor group 49, which is used to detect errors, in addition to the above-mentioned printing unit 10 and the pattern sensors 15. The sensor group 49 includes a plurality of sheet position sensors 50, a remaining sheet sensor 51, and a sheet size sensor 52. The sheet position sensors 50 are disposed at respective positions on a conveying path of the sheet 3, and output detection signals corresponding to the presence or absence of the sheet 3. The CPU 40 may detect the position of the sheet 3 or the occurrence of a jam on the basis of the detection signals output from the sheet position sensors 50.

The remaining sheet sensor 51 outputs a detection signal that corresponds to the amount of sheets 3 stacked in the supply tray 4, and the CPU 40 can detect the presence or absence of the sheet 3 and the remaining amount of sheets on the basis of the detection signal of the remaining sheet sensor 51. The sheet size sensor 52 outputs a detection signal corresponding to the position of a sheet guide (not shown) that is provided at the supply tray 4, and the CPU 40 detects the size of the stacked sheets 3 on the basis of the detection signal of the sheet size sensor. Meanwhile, in addition to those, for example, the sensor group 49 includes various sensors such as a remaining toner sensor (not shown) that is used to detect the remaining amount of toner of the developing cartridges 22.

(Job Execution Processing)

Figure 3:
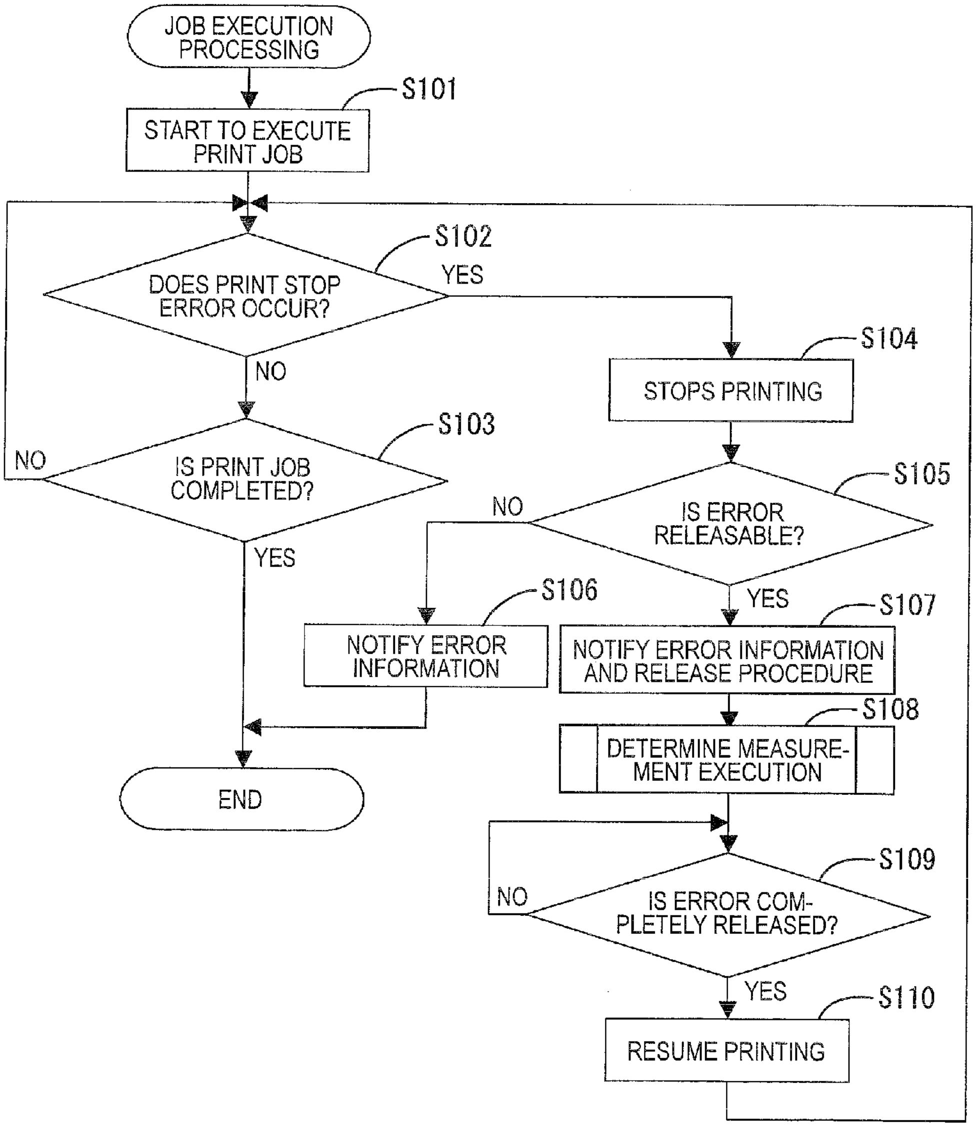
FIG. 3 is a flowchart illustrating job execution processing.
Figure 4:
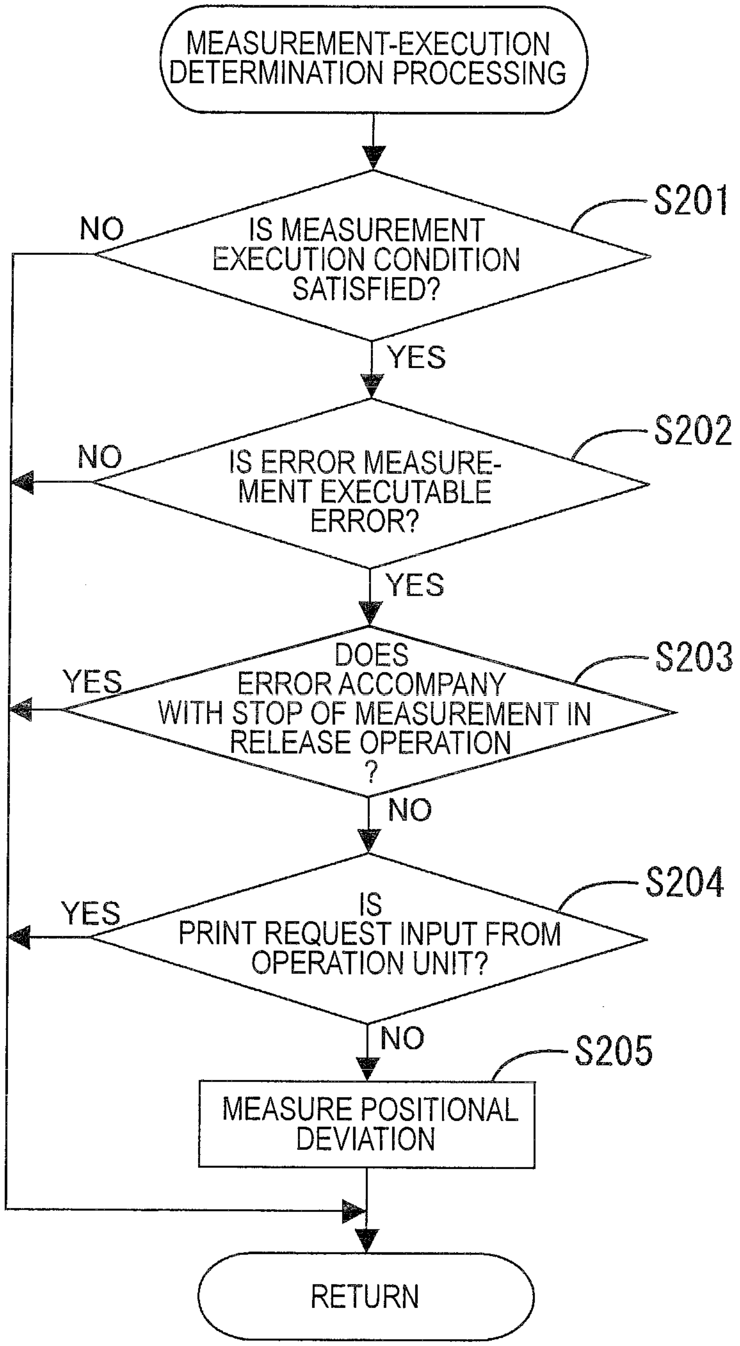
FIG. 4 is a flowchart illustrating measurement-execution determination processing.

FIG. 3 is a flowchart illustrating job execution processing, and FIG. 4 is a flowchart illustrating measurement-execution determination processing.

The printer 1 can perform PC printing that prints print data received from an external computer, etc., and direct printing that prints data received from a USB memory, etc. When the PC printing is performed, the user generates print data including a print request in a computer, etc. and sends the print data to the printer 1. When receiving the print data through the network interface 44, the CPU 40 of the printer 1 registers the print data in a print queue as a print job.

Further, when the direct printing is performed, the user connects a storage medium such as a USB memory to the USB interface 45, inputs an execution instruction (print request) of the direct printing, and designates print object data stored in the USB memory and the like by the operation unit 48. After receiving this, the CPU 40 of the printer 1 receives print object data from the USB memory or the like and registers the print object data in a print queue as a print job.

Furthermore, if the print job is registered in the print queue, the CPU 40 starts job execution processing illustrated in FIG. 3. In the job execution processing, first, the CPU 40 starts to execute the print job (print processing) (S101). That is, the CPU feeds the sheet 3 from the supply tray 4 and starts to print an image based on the print data by the printing unit 10. Moreover, it is determined whether the occurrence of a print stop error is detected during the execution of the print job on the basis of the output of the sensor group 49 (S102).

Here, the print stop error is defined as an error, which makes a printing operation stop, among various errors that can be detected by the CPU 40. The print stop error is generally the error where the continuation of a printing operation is impossible. Specifically, for example, a hardware trouble error, a toner empty error, a sheet run-out error, a jam error, a sheet size error, etc. are included in the print stop error.

If the occurrence of the print stop error is not detected (No in S102), the CPU determines whether the execution of the print job is completed (S103). If the execution of the print job is not completed (No in S103), a process returns to S102 and the same processing is repeated.

Further, if the occurrence of the print stop error is detected (Yes in S102), the CPU 40 stops the printing operation (S104). Subsequently, the CPU determines whether the detected error is the error that can be released by the user (S105). In the above-mentioned embodiment, the toner empty error, the sheet run-out error, the jam error, and the sheet size error correspond to the releasable error, and the hardware trouble error corresponds to an unreleasable error.

If the detected error is the error that cannot be released by the user (No in S105), the CPU 40 displays error information, which is used to notify the user of the contents of the error, on the display unit 47 (S106) and terminates the job execution processing.

Further, if the detected error is the error that can be released by the user (Yes in S105), the CPU displays the error information and a release procedure on the display unit 47 (S107). Meanwhile, the CPU can notify the user, who has sent a print request of the PC printing, of the error information and the release procedure by sending information to an external computer, etc. through the network interface 44.

Release procedures for various releasable errors will be specifically described. The user can release the toner empty error by replacing the developing cartridge 22, of which the toner is run out, with a new developing cartridge. The user can release the sheet run-out error by replenishing the supply tray 4 with sheets 3. The sheet size error is the error where the sheet size designated by a print request does not correspond to the size of the sheets 3 stacked in the supply tray 4, and the user can release the sheet size error by replacing the sheets 3 of the supply tray 4 with sheets 3 having an appropriate size.

The jam errors are classified into three kinds of jams, that is, a sheet feed jam, a transfer jam, and a fixing jam, according to the position where the sheets 3 are jammed. In the sheet feed jam, the front end of the sheet 3 is positioned between the sheet feed roller 5 and the registration roller 6. The user can release the sheet feed jam by drawing the supply tray 4 from the main body casing 2 and taking out the sheet 3 from the inside. In the transfer jam, the sheet 3 is positioned near a transfer position between the photosensitive drum 28 and the transfer roller 14. The user can release the transfer jam by opening the upper cover 2A, removing appropriate process units 19K to 19C, and taking out the sheet 3 from the inside.

In the fixing jam, the rear end of the sheet 3 passes the most downstream transfer position and is positioned near the fixer 31. The user tries taking out the sheet 3 after opening the rear cover 2B first. Then, if the user cannot take out the sheet (that is, if most of the sheet 3 is jammed at the front of the fixer 31), the user can release the fixing jam by further opening the upper cover 2A, removing necessary process units 19K to 19C, and taking out the sheet.

If the error information and the release procedure are notified to the user as described above, the user may start to release the error.

After notifying the user of error information, etc., the CPU 40 performs measurement-execution determination processing (S108). The measurement-execution determination processing is processing for determining whether to execute the measurement of a positional deviation and controlling the execution of the measurement of the positional deviation in accordance with the determination.

Meanwhile, the CPU 40 can measure a positional deviation of the printed image and measure a density of the printed image. The CPU 40 corrects the density of the printed image on the basis of the result of the measurement of the density, and corrects the positional deviation of the printed image on the basis of the result of the measurement of the positional deviation during the printing. For example, when power is supplied, when new developing cartridges 22 or process units 19K to 19C are detected, when the opening or closing of the upper cover 2A is detected, when a measurement execution instruction is input by the user, or the like, the measurement of a positional deviation and measurement of density are executed.

If the measurement-execution determination processing illustrated in FIG. 4 starts, the CPU 40 determines first whether a predetermined measurement execution condition is satisfied (S201). The measurement execution condition is a condition that is used to determine whether the measurement of the positional deviation needs to be executed (or whether the measurement of the positional deviation is preferably executed) in order to secure image quality. Specifically, the measurement execution condition means that, for example, time elapsed from the execution of the measurement of the previous positional deviation, the number of printed sheets, or the change of temperature is equal to or larger than a threshold value.

If the measurement execution condition is not satisfied (No in S201), the CPU 40 finishes the measurement-execution determination processing without executing the measurement of the positional deviation. Further, if the measurement execution condition is satisfied (Yes in S201), the CPU determines whether the detected error is a measurement executable error (S202). Here, the measurement executable error means an error, where a measuring operation can be executed, of the above-mentioned print stop error, and is an error where at least the formation of an image on the belt 13, the drive of the belt 13, and the detection using the pattern sensors 15 are normally detected. In the above-mentioned embodiment, the sheet run-out error, the sheet size error, the sheet feed jam, and the fixing jam correspond to the measurement executable error, and the hardware trouble error, the toner empty error, and the transfer jam do not correspond to the measurement executable error. If the detected error is not the measurement executable error (No in S202), the CPU finishes the measurement-execution determination processing.

If the detected error is the measurement executable error (Yes in S202), subsequently, the CPU 40 determines whether the detected error is the error accompanying the stop of measurement in a release operation (S203). That is, the measurement executable error includes the error where measurement and a release operation can be executed at the same time and the error where measurement and a release operation cannot be executed at the same time. Since the attachment and detachment of the process units 19K to 19C are required to release the fixing jam of the above-mentioned measurement executable error at some positions of the sheet 3, the fixing jam corresponds to the error that accompanies the stop of measurement in a release operation. The other jams correspond to the error that does not accompany the stop of measurement in a release operation. If the detected error is the error that accompanies the stop of measurement in a release operation (Yes in S203), the CPU finishes the measurement-execution determination processing.

Further, if the detected error is the error that does not accompany the stop of measurement in a release operation (No in S203), the CPU 40 determines whether a print request for the stopped print job is input from the operation unit 48 (S204). If the print request is input from the operation unit 48 (No in S204), that is, if the print job of the direct printing is stopped here, the CPU finishes the measurement-execution determination processing without executing the measurement of the positional deviation. Further, if the print request is not input from the operation unit 48 (Yes in S204), that is, if the print job of the PC printing is stopped, subsequently, the CPU executes the measurement of the positional deviation (S205).

Figure 5:
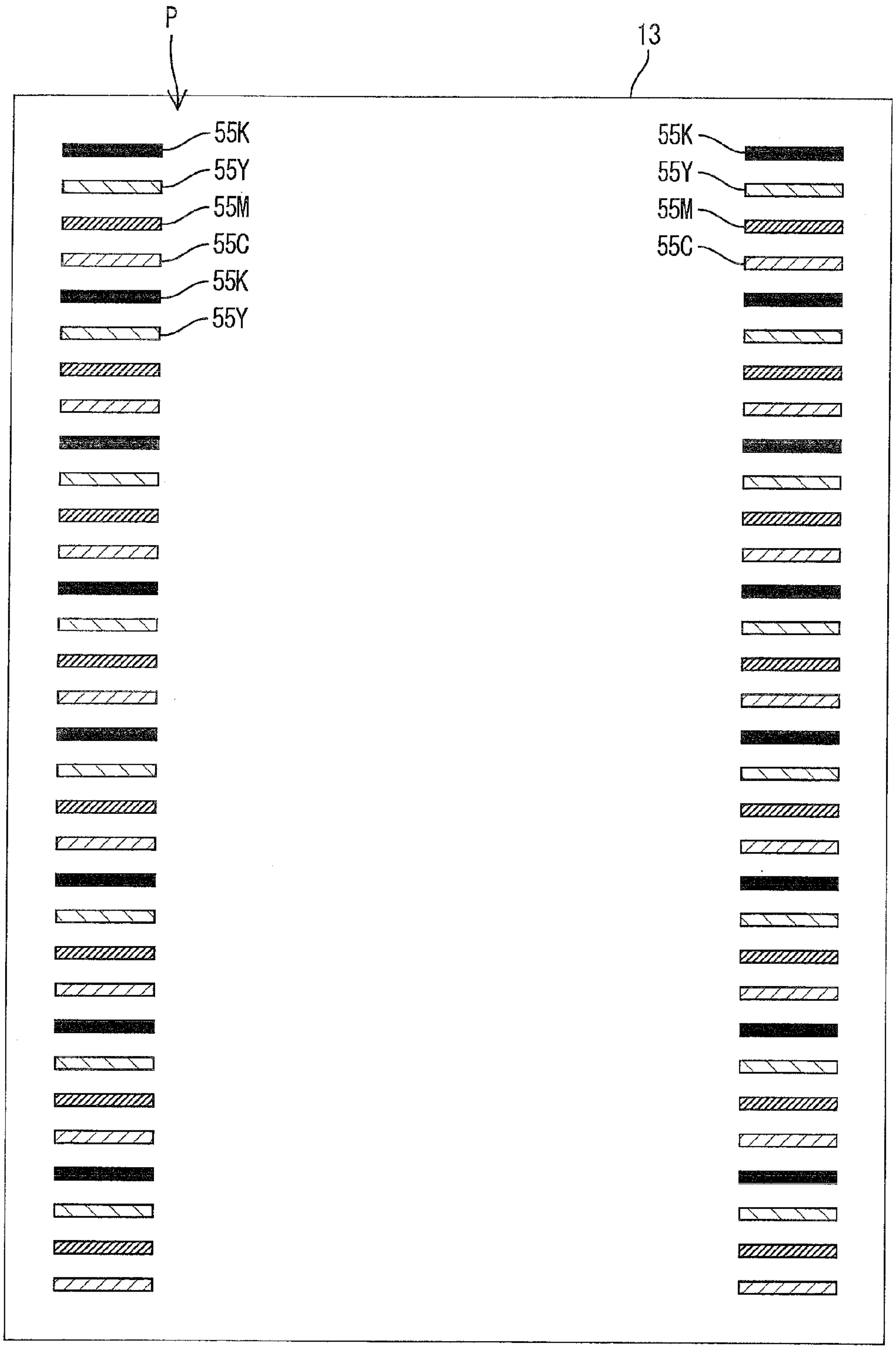
FIG. 5 is a plan view showing a pattern that is used to measure a positional deviation.

FIG. 5 is a plan view showing a pattern P that is used to measure a positional deviation.

The CPU 40 forms a pattern P, which is used to measure the positional deviation, on the belt 13 by the printing unit 10. As shown in FIG. 5, the pattern P is formed of marks 55K, 55Y, 55M, and 55C, which correspond to respective colors, are arranged in line on both left and right portions of the belt 13, and are elongated in a main scanning direction. The pattern P is formed of a plurality of sets of marks 55K to 55C that are disposed, for example, on the entire periphery of the belt 13 at intervals in a sub-scanning direction while four marks 55K to 55C, which are arranged in line in order of black, yellow, magenta, and cyan, forms one set. Intervals between the marks 55K to 55C, which are adjacent to each other, are the same as each other when each of the marks 55K to 55C is formed at ideal positions without a positional deviation.

Subsequently, the CPU 40 measures the timings of each set of marks 55K to 55C, where each of the marks 55K to 55C passes the detection positions of the pattern sensors 15, from the signals output from the pattern sensors 15. Further, the CPU 40 obtains the positional deviations, which are based on the black mark 55K, of the marks 55Y, 55M, and 55C of other colors (which are referred to as correction colors) in the sub-scanning direction, on the basis of the result of the measurement of the position of each of the marks 55K to 55C. Furthermore, the CPU calculates average values of the positional deviations of the correction colors for all sets, calculates new correction values for denying the positional deviations of the average values, and updates the respective correction colors, which are stored in the NVRAM 43, with the new correction values. Then, the CPU terminates the measurement of the positional deviations, and finishes the measurement-execution determination processing.

If the measurement of the positional deviation is executed in the above-mentioned measurement-execution determination processing, the user may progress a release operation of the error during the measurement of the positional deviation.

After executing the measurement-execution determination processing in S108 of FIG. 3, the CPU 40 determines whether the error is released on the basis of the output from the sensor group 49 (S109). If the release of the error is not completed (No in S109), the CPU stands by until the release of the error is completed.

Further, if the error is released (Yes in S109), the CPU 40 resumes the stopped print job (S110). In this case, if a page that is not completely printed exists when the print job is stopped, printing starts from this page. After that, if the process returns to S102, the same processing is repeated, and the entire print job is completed in S103 (Yes in S103), the job execution processing is terminated.

Advantages of this Embodiment

As described above, according to the embodiment, if the occurrence of the measurement executable error where image measurement processing (the measurement of the positional deviation) can be executed, that is, the error that stops print processing is detected during the print processing (print job), the print processing is stopped and the image measurement processing is executed. For example, if the image measurement processing starts after the print processing is stopped when a sheet run-out error is detected during the print processing, the image measurement processing may be performed until the user replenishes the sheets. That is, since the image measurement processing is performed using time when print processing cannot be executed originally due to the occurrence of the error, it may be possible to reduce the user's burden of waiting time as a whole.

Further, if a predetermined measurement execution condition is satisfied when the print processing is stopped due to the detection of a measurement executable error, the image measurement processing is executed. That is, if the image measurement processing is performed whenever the error occurs, there is a possibility that unnecessary image measurement processing will be executed. However, it may be possible to execute the image measurement processing at an appropriate timing by providing another measurement execution condition.

Further, even though print processing is stopped due to the detection of the measurement executable error, the image measurement processing is not executed if the print processing is based on the print request input from the operation unit 48. That is, if a print request is input from the operation unit 48, it is thought that there is a high possibility that the error is released early since there is the user near the apparatus. Accordingly, if the error is released early, the image measurement processing cannot be completed by the error is released and user's waiting time is generated. Therefore, if the print request is input from the operation unit 48, it may be possible to avoid the occurrence of the waiting time by not executing the image measurement processing.

Furthermore, even when the print processing is stopped due to the detection of the measurement executable error, the image measurement processing is not executed if the error is the error accompanying the stop of the image measurement processing in a release operation. For example, if the image measurement processing is performed when the error accompanying the stop of the image measurement processing in a release operation occurs, such as when the components (process units 19K to 19C and the like) of the printing unit 10 need to be moved for the release of the error due to a jam error or the like, the image measurement processing should be stopped or the termination of the image measurement processing should be put on stand by in order to release the error. The image measurement processing becomes ineffective in the case of the former. In the case of the latter, time is taken until the release operation of the error is completed. However, according to this configuration, it may be possible to avoid these situations.

Moreover, the measurement unit can execute the measurement of a positional deviation and the measurement of density, and executes only the measurement of a positional deviation when the print processing is stopped due to the detection of a measurement executable error. If the measurement of density is executed when the print processing is stopped, the density (shade) is changed between images that are printed before and after the stop of the print processing, so that there is a concern that the images are significantly different from each other in appearance. Further, if the print processing is stopped, it may be possible to prevent the difference in appearance by performing only the measurement of a positional deviation that has a relatively small effect on the appearance of the image.

Second Embodiment

Figure 6:
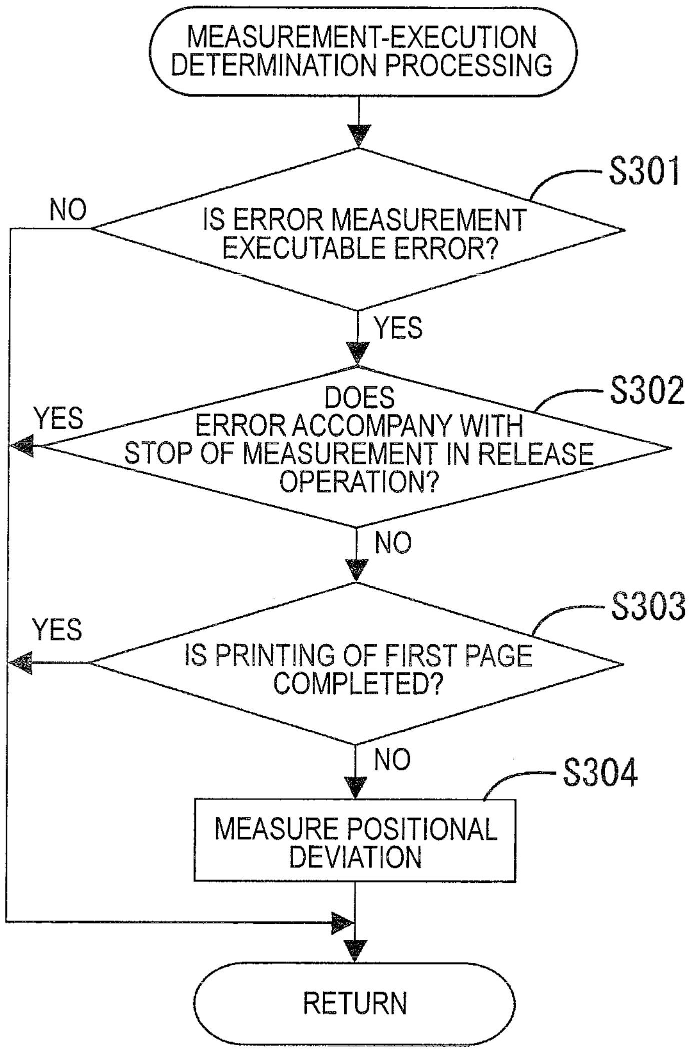
FIG. 6 is a flowchart illustrating measurement-execution determination processing of a second embodiment.

A second embodiment of the invention will be described below with reference to FIG. 6. FIG. 6 is a flowchart illustrating measurement-execution determination processing. The entire flow (FIG. 3) of job execution processing and the configuration of a printer 1 according to this embodiment are the same as those according to the first embodiment.

The CPU 40 determines first whether the detected error is a measurement executable error (S301). Further, if the error is not a measurement executable error (No in S301), the CPU finishes the measurement-execution determination processing without executing the measurement. Further, if the detected error is a measurement executable error (Yes in S301), the CPU determines whether the error is the error accompanying the stop of measurement in a release operation (S302). If the error is the error accompanying the stop of measurement (Yes in S302), the CPU finishes the measurement-execution determination processing.

Further, if the error is the error that does not accompany the stop of measurement in a release operation (No in S302), subsequently, the CPU 40 determines whether the printing of a first page is completed (S303). If the printing of a first page is completed (Yes in S303), that is, the printing of a second or later pages is stopped, the CPU 40 finishes the measurement-execution determination processing without executing the measurement. If the printing of the first page is not completed (No in S303), the CPU 40 executes the measurement of a positional deviation (S304) and then finishes the measurement-execution determination processing.

If image measurement processing (the measurement of a positional deviation) is executed in the middle of the pages when the print processing (print job) of a plurality of pages is stopped, the image quality is changed between pages that are printed before and after the stop of the print processing, so that there is a concern that the pages are significantly different from each other in appearance. In contrast, in this configuration, image measurement processing is executed if print processing is stopped before the completion of the printing of a first page, and image measurement processing is not executed if print processing is stopped after the completion of the printing of the first page. Accordingly, it may be possible to prevent the image quality of the pages from being changed between before and after the stop.

Other Embodiments

The invention is not limited to the embodiments that have been described with the above description and drawings. For example, the following embodiments are also included in the scope of the invention.

(1) An electrophotographic and direct transfer type color printer has been described in the above-mentioned embodiments. However, the invention may also be applied to, for example, other types of printing apparatuses such as an intermediate transfer type or 4-cycle type printing apparatus, and may also be applied to another type of printing apparatus such as an ink jet printing apparatus. In addition, the invention may be applied to a printing apparatus which is dedicated to monochrome printing and does not have a color print function. Further, the invention may be applied to a printing apparatus or the like that executes the printing of facsimile data received through, for example, a phone line (one example of a communication line) or the printing (copy) of a document image data read out from a document reading device as a print job.

(2) In the embodiments, the measurement of a positional deviation in a sub-scanning direction has been described as the image measurement processing executed at the time of the occurrence of the error. However, a positional deviation may be measured in a main-scanning direction. Further, the measurement of density instead of the measurement of a positional deviation may be performed as the image measurement processing, and both the measurement of density and the measurement of a positional deviation may be performed.

A condition, which is used to perform an image measurement processing at the time of the occurrence of the error, is not limited to the conditions shown in FIGS. 4 and 6, and may be appropriately changed. For example, some of the determination steps may be omitted and a step may be skipped to the next step in the measurement-execution determination processing shown in FIG. 4 or 6. Further, if the detected error is a measurement executable error, the image measurement processing may always be executed. Furthermore, the kinds of errors to be detected are not be applied to the above-mentioned errors, and may be appropriately changed according to the appropriate configuration.

What is claimed is:

1. A printing apparatus comprising:
a printing unit which prints an image on a recording medium;
a controller configured to cause the printing unit to execute print processing on the basis of a print request;
a measurement unit configured to execute an image measurement processing using the image printed by the printing unit;
a correction unit configured to correct the image to be printed by the printing unit on the basis of the result of the image measurement processing; and
a detector configured to detect an occurrence of a measurement executable error which stops print processing performed on the recording medium by the printing unit and configured to cause the measurement unit to execute the image measurement processing,
wherein the controller is further configured to control the printing unit to stop processing the print processing and further configured to control the measurement unit to execute the image measurement processing, when the detector detects the measurement executable error during the print processing.

2. The printing apparatus according to claim 1, wherein if a predetermined measurement execution condition is satisfied when the print processing is stopped due to the detection of the measurement executable error, the measurement unit executes the image measurement processing.

3. The printing apparatus according to claim 1, further comprising:
an operating unit which allows an input operation of the print request; and
a communication unit which receives the print request through a communication line,
wherein if the print processing is based on the print request input from the operating unit even when the print processing is stopped due to the detection of the measurement executable error, the measurement unit does not execute the image measurement processing.

4. The printing apparatus according to claim 1, wherein
the measurement executable error includes an error that accompanies the stop of the image measurement processing in a release operation, and an error that does not accompany the stop of the image measurement processing in a release operation, and
the measurement unit does not execute the image measurement processing when the measurement executable error is the error accompanying the stop of the image measurement processing in the release operation even when the print processing is stopped due to the detection of the measurement executable error.

5. The printing apparatus according to claim 1, wherein
the measurement unit is further configured to measure a positional deviation of the printed image and measure density of the printed image,
the measurement unit is further configured to only measure the positional deviation if the print processing is stopped due to the detection of the measurement executable error, and
the correction unit is further configured to correct the positional deviation of the printed image on the basis of the result of the measurement of the positional deviation, and corrects the density of the printed image on the basis of the measurement of the density.

6. The printing apparatus according to claim 1, wherein if a page that is not completely printed exists when the print processing for printing a plurality of the pages is stopped, the controller is further configured to print the page, which is not completely printed, after the release of the detected measurement executable error, the measurement unit is further configured to execute image measurement processing if the print processing is stopped before the printing of a first page of the print processing is completed, and the measurement unit is further configured to not execute the image measurement processing if the print processing is stopped after the printing of the first page of the print processing is completed.

* * * * *